(12) United States Patent
Bandini et al.

(10) Patent No.: US 7,894,930 B2
(45) Date of Patent: Feb. 22, 2011

(54) METHOD AND DEVICE FOR COMPOSITE MACHINING BASED ON TOOL-PATH PATTERN TYPES WITH TOOL AXIS ORIENTATION RULES

(75) Inventors: Francesco Bandini, Florence (IT); Roberto Parigi, Florence (IT)

(73) Assignee: DP Technology, Corp., Camarillo, CA (US)

( * ) Notice: Subject to any disclaimer, the term of this patent is extended or adjusted under 35 U.S.C. 154(b) by 157 days.

(21) Appl. No.: 12/027,462

(22) Filed: Feb. 7, 2008

(65) Prior Publication Data

US 2009/0204253 A1 Aug. 13, 2009

(51) Int. Cl.
*G06F 19/00* (2006.01)
(52) U.S. Cl. .......................... 700/190; 700/180; 700/192
(58) Field of Classification Search .................. 700/180, 700/183, 185, 190, 175, 186, 192, 259, 264
See application file for complete search history.

(56) References Cited

U.S. PATENT DOCUMENTS

| | | | |
|---|---|---|---|
| 3,867,616 A * | 2/1975 | Korelitz et al. .................. 703/1 |
| 4,369,563 A * | 1/1983 | Williamson .................... 483/7 |
| 5,090,851 A * | 2/1992 | White ......................... 409/199 |
| 5,239,160 A | 8/1993 | Sakura et al. | |
| 5,453,933 A | 9/1995 | Wright et al. | |
| 5,898,590 A * | 4/1999 | Wampler et al. ............. 700/174 |
| 6,022,132 A * | 2/2000 | Schulz ........................ 700/186 |
| 6,112,133 A * | 8/2000 | Fishman ..................... 700/182 |
| 6,167,328 A * | 12/2000 | Takaoka et al. ............. 700/264 |
| 6,507,806 B1 * | 1/2003 | Tandler .......................... 703/1 |
| 6,556,879 B1 | 4/2003 | Matsumoto et al. | |
| 6,571,148 B1 * | 5/2003 | Wunder ...................... 700/175 |
| 6,681,151 B1 * | 1/2004 | Weinzimmer et al. ....... 700/259 |
| 6,795,749 B2 | 9/2004 | Suh et al. | |
| 6,907,312 B2 | 6/2005 | Sagawa et al. | |
| 6,951,440 B2 * | 10/2005 | Piccolo ........................ 409/216 |
| 7,031,893 B2 | 4/2006 | Gupta et al. | |
| 7,096,087 B2 | 8/2006 | Sagawa et al. | |
| 7,226,255 B2 | 6/2007 | Zhang et al. | |
| 2003/0171842 A1 * | 9/2003 | Teramoto et al. ............ 700/182 |

FOREIGN PATENT DOCUMENTS

| | | |
|---|---|---|
| WO | WO 94/11795 | 5/1994 |
| WO | WO 9411795 | * 5/1994 |

OTHER PUBLICATIONS

International Search Report from Serial No. PCT/US09/30333 dated Jul. 9, 2009.

(Continued)

*Primary Examiner*—Crystal J Barnes-Bullock
(74) *Attorney, Agent, or Firm*—Michael Blaine Brooks, PC; Michael B. Brooks

(57) ABSTRACT

Computer-enabled methods and devices allow for the ready set-up for machine instruction generation by addressing various combinations of machining patterns and tool axis orientations via the selection or designation of a machining pattern and the selection or designation of a tool axis orientation via exemplary separate menus of a user interface.

14 Claims, 7 Drawing Sheets

OTHER PUBLICATIONS

*Delcam Partmaker Ltd., et al*, v. *D.P. Technology Corporation* Civil Docket No. 02-cv-7084, "Stipulation of Dismissal Without Prejudice", US District Court, dated Mar. 2, 2010.
*IMCS, Inc., v. D.P. Technology Corporation* Civil Docket No. 02-cv-7084, "Complaint", US District Court Eastern District of Pennsylvania, filed Aug. 30, 2002.
*IMCS, Inc., v. D.P. Technology Corporation* Civil Docket No. 02-cv-7084, "Civil Cover Sheet", US District Court Eastern District of Pennsylvania, filed Aug. 30, 2002.
*IMCS, Inc. v. D.P. Technology Corporation* Civil Docket No. 02-cv-7084. "Summons in a Civil Action", US District Court Eastern District of Pennsylvania, filed Aug. 30, 2002.

\* cited by examiner

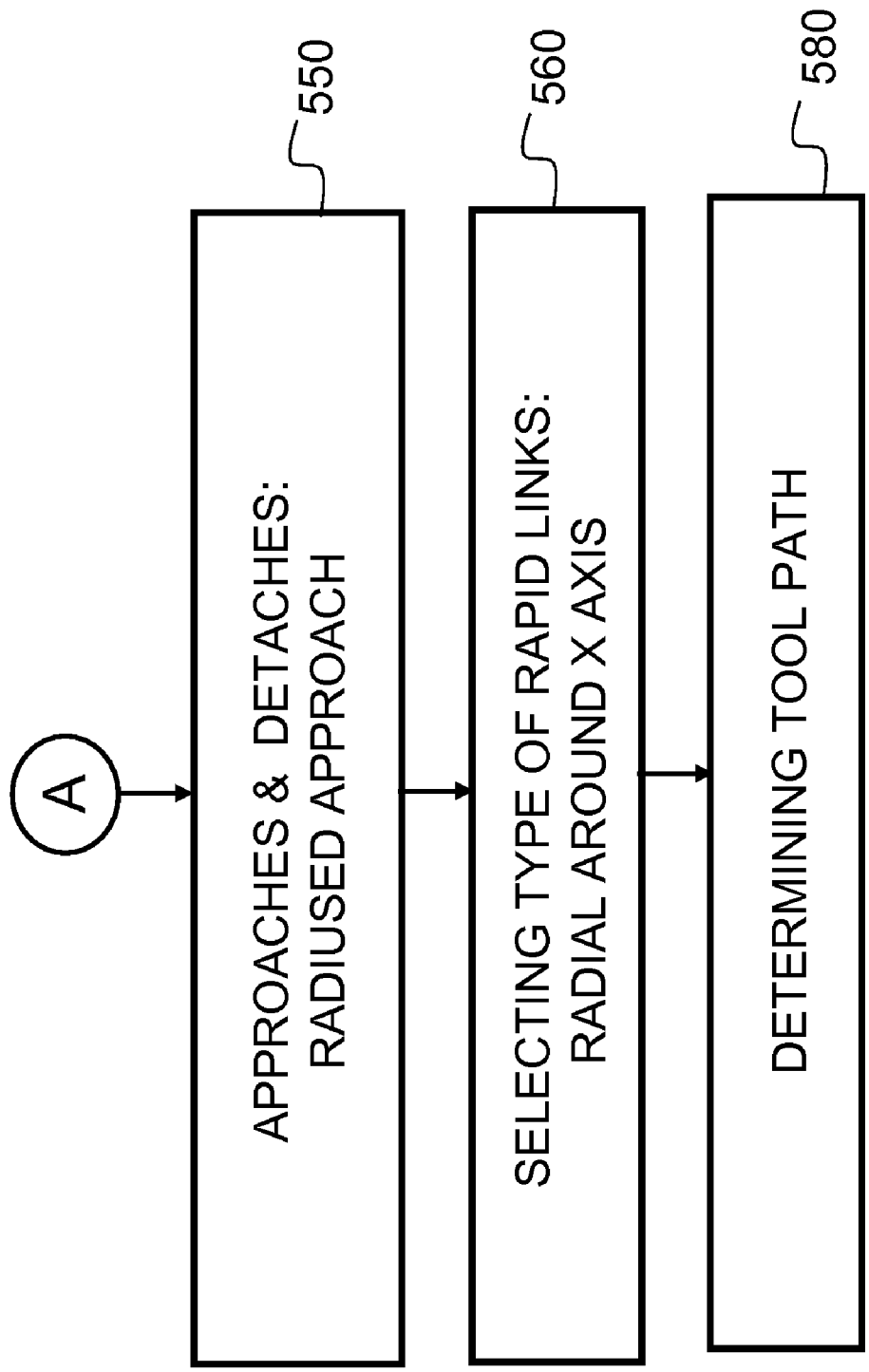

METHOD AND DEVICE FOR COMPOSITE MACHINING BASED ON TOOL-PATH PATTERN TYPES WITH TOOL AXIS ORIENTATION RULES

FIELD OF ENDEAVOR

The invention in its several embodiments relates generally to tool path trajectory planning for computer aided manufacturing (CAM) and more particularly to the definitions made by the user interface to set up programming for computer numerical control (CNC) of a multi-axis machine tool for workshop machining.

BACKGROUND

Computer aided manufacturing (CAM) software systems are used to program computer numerical control (CNC) machine tools that are used in machine shops for the production of discrete parts such as molds, dies, tools, prototypes, aerospace components and more. There is an increasing trend in the modern machine shop to apply simultaneous five-axis machine tools that are capable of 3-axis linear (X, Y, Z) movements in combination with 2-axis (A, B) rotational movements. In this type of machine, during the machining process, the cutting tool and the workpiece are moved simultaneously in five-axes relative to each other as described by a CNC program.

Generating a CNC program to control the movements of these five-axis machine tools—one that fully exercises all five axes—is challenging because such application present complexities that may be both mathematical and technological in nature. A CAM system for programming five-axis machine tools should be easy for the user to operate and should produce error-free CNC programs. Any small error in the CNC program will result in expensive and/or irreparable damage to the workpiece, cutting tools and/or the machine tool itself. When executed, the state of the art five-axis CAM software contains a number of specific machining cycles where, in an effort to make the machining cycle understandable for the user, each cycle contains a smaller number of options. That is, the current state-of-the-art in five-axis CAM software provides the user a machining cycle which is comprised of a single, or a small number, of patterns with a single, or a small number of, orientations. Each combination of pattern and orientation is commonly presented as a new machining cycle. The limited number of options results in those machining cycles being inflexible, due to the limited number of uses. In addition, the number of specific machining cycles results in the duplication of the detailed steps of execution of each independent machining cycle in order to cover the wide variety of machining needed. From the point of view of the embodied CAM steps, the proliferation of machining cycles, often with overlapping requirements, exponentially increases the effort to embody the steps and maintain both the internal steps for execution via machine-readable code and the user interface. The volume of internal steps and maintenance thereof can work to strain the reliability of CAM steps.

SUMMARY

Computer-enabled methods and devices of the present invention allow for the ready set-up for machine instruction generation by addressing various combinations of machining patterns and tool axis orientations via the selection or designation of a machining pattern and the selection or designation of a tool axis orientation, for example via separate menus of a user interface. The invention, in its several embodiments includes a computer-enabled method of tool position planning for operations to be performed by a machining tool of a machining station on a workpiece in accordance with the tool position plan, the method comprising: (a) receiving a machining pattern; (b) receiving a tool axis orientation, in either order of occurrence; (c) determining a tool position plan based on the received machining pattern and the received tool axis orientation; and (d) outputting the tool position plan as one or more machine instructions. In some exemplary embodiments of the computer-enabled method, the machining pattern may be based on a user selection from a first menu comprising a plurality of machining patterns. In some exemplary embodiments of the computer-enabled method, the tool axis orientation may be based on a user selection from a second menu comprising a plurality of tool axis orientations. In some exemplary embodiments of the computer-enabled method, before the step of receiving a tool axis orientation, there may be a step of defining the orientation of the machining tool axis relative to the workpiece. In some exemplary embodiments the computer-enabled method, before the step of receiving a machining pattern, there may be a step of determining an area of the workpiece to be machined. In some exemplary embodiments the computer-enabled method, before the step of determining a tool position plan based on the received machining pattern and the received tool axis orientation, there may be a step of defining one or more rules for at least one of: (i) approaching the workpiece; (ii) departing the workpiece; and (iii) linking two or more sub-areas of the defined area of the workpiece to be machined. In some exemplary embodiments the computer-enabled method, before the step outputting the tool position plan as one or more machine instructions, there may be a step of converting into one or more machine instructions at least one of: (i) the defined area of the workpiece to be machined; (ii) the received machining pattern; (iii) the received tool orientation; and (iv) at least one of the defined rules for approaching the workpiece, departing the workpiece, and linking two or more sub-areas of the defined area of the workpiece to be machined.

The invention, in its several embodiments, also includes a device for generating instructions for a machining tool, the device comprising: (a) input means for receiving a machining pattern; (b) input means for receiving a tool axis orientation; (c) a processing module having addressable memory, the processing module adapted to determine a tool position plan based on a received machining pattern and a received tool axis orientation; and (d) means for outputting the tool position plan as one or more machine instructions. In some embodiments of the device for generating instructions for a machining tool, the input means for receiving a machining pattern may be at least one of: an electrical communication; a wireless communication receiver; a reader of a memory store; and a reader of portable media. In some embodiments of the device for generating instructions for a machining tool, the input means for receiving a tool axis orientation is at least one of: an electrical communication; a wireless communication receiver; a reader of a memory store; and a reader of portable media. In some embodiments of the device for generating instructions for a machining tool, the means for outputting the tool position plan is at least one of: an electrical communication; a wireless communication transmitter; a writer to a memory store; and a writer to portable media. In some embodiments of the device for generating instructions for a machining tool, the device further comprises a user interface adapted to receive a user selection from a first menu comprising a plurality of machining patterns. In some embodiments of the device for generating instructions for a machining tool, the device further comprises a user interface adapted to receive a user selection from a second menu comprising a plurality of tool axis orientations. In some embodiments of the device for generating instructions for a machining tool, the device further comprises a user interface adapted to receive a user selection from a first menu comprising a plurality of machining patterns and from a second menu comprising a plurality of tool axis orientations. In some embodiments of the device for generating instructions for a machining tool, the device further comprises input means for receiving a workpiece area definition wherein the input means for receiving a workpiece area definition is at least one of: a user interface, an electrical communication; a wireless communication receiver; a reader of a memory store; and a reader of portable media. In some embodiments of the device for generating instructions for a machining tool, the device may be further adapted to determine a tool position plan based on a received machining pattern, a received tool axis orientation, and a defined workpiece area to be machined.

BRIEF DESCRIPTION OF THE DRAWINGS

For a more complete understanding of the present invention reference is now made to the following description taken in conjunction with the accompanying drawings, in which:

FIG. 5A and FIG. 5B together are a top level flowchart of an exemplary method embodiment of the present invention.

DETAILED DESCRIPTION

Figure 1:
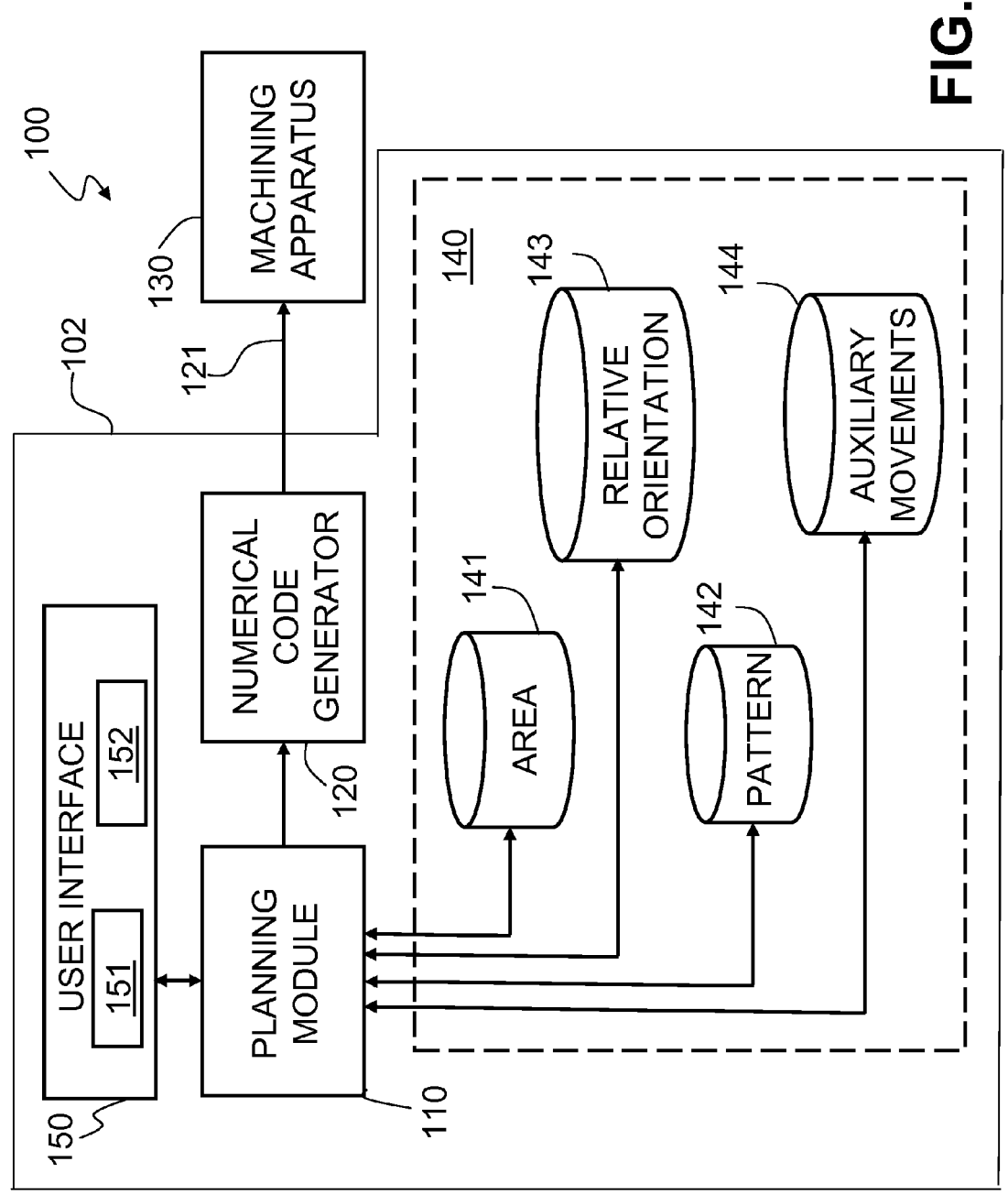
FIG. 1 is a top level functional block diagram of a system embodiment of the present invention.

The invention in its several embodiments includes a computer aided manufacturing system 100, as illustrated in a functional block diagram in FIG. 1, where the system comprises a machining apparatus 130 and a device 102 comprising a planning module 110 and a numerical code generator 120. The planning module 110 has a processing module and the numerical code generator 120 may be a separate processing module or may be embodied as computer-executed instructions that are executed by the processing module of the planning module. The machining apparatus 130 may provide a machining tool or cutting tool and may reorient the cutting tool relative to a workpiece according to instructions provided by the numerical code generator 120. The position of the cutting tool may be expressed in three absolute positions, i.e., XYZ, and two rotary positions, i.e., A—a rotary position about X, and B—a rotary position about Y. The numerical code generator may be responsive to the output of the planning module 110. The planning module may have access to one or more databases 140 comprising computer-based models of: (a) areas 141 of a workpiece to be machined; (b) patterns 142 that may be applied for machining the workpiece; (c) relationships expressing the relative orientation 143 between a cutting tool of the machining apparatus 130 and the workpiece; and (d) auxiliary movements 144 that may include: (1) instructions for approaching the workpiece; (2) instructions for departing the workpiece; and (3) instructions for movements linking machining sub-areas. Via a user interface 150, a user of the system 100 may select files or objects from the databases 140 for application by the planning module 110 to generate the numerical code 121 that may, for example, be G-code. The machining apparatus 130 may then receive the G-code and execute the coded instructions to drive the machine tool. For example, the device may have a user interface 150 adapted to receive a user selection from a first menu 151 that may be a touch screen, or a display and indicating device, where the first menu 151 includes a plurality of machining patterns and the device may have a user interface 150 adapted to receive from a second menu 152 that may be presented via the same touch screen, or a display and indicating device, as the first menu 151 or via a separate touch screen, or a display and indicating device, where the second menu 152 includes a plurality of tool axis orientations.

Figure 2:
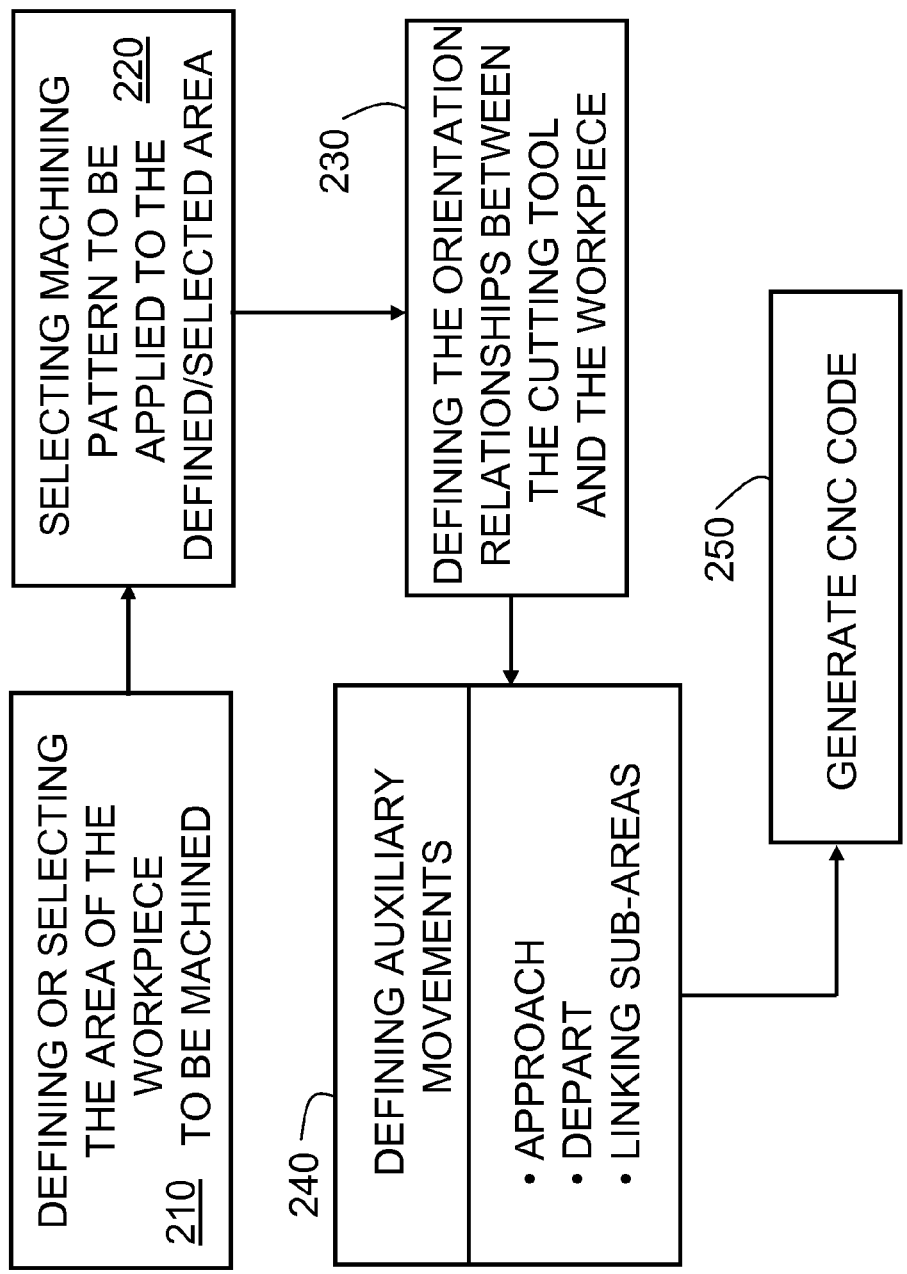
FIG. 2 is a top level flowchart of an exemplary method embodiment of the present invention.

The invention in its several embodiments includes an exemplary method of five-axis machining, as illustrated in a top-level flowchart of FIG. 2 where a composite machining cycle includes a planning or programming process comprising four steps which may then be followed by the CNC coding. The exemplary four planning steps of the five-axis composite machining comprise: (a) defining or selecting the area of the workpiece to be machined (step 210); (b) selecting the pattern to apply when machining the selected area (step 220); (c) defining the orientation of the relationships between the cutting tool and the workpiece (step 230); and (d) defining the auxiliary movements (step 240) that may include: (1) approaching the workpiece; (2) departing the workpiece; and (3) movements linking machining sub-areas. Thereafter, the method may include the step of generating the CNC code (step 250).

Figure 3A:
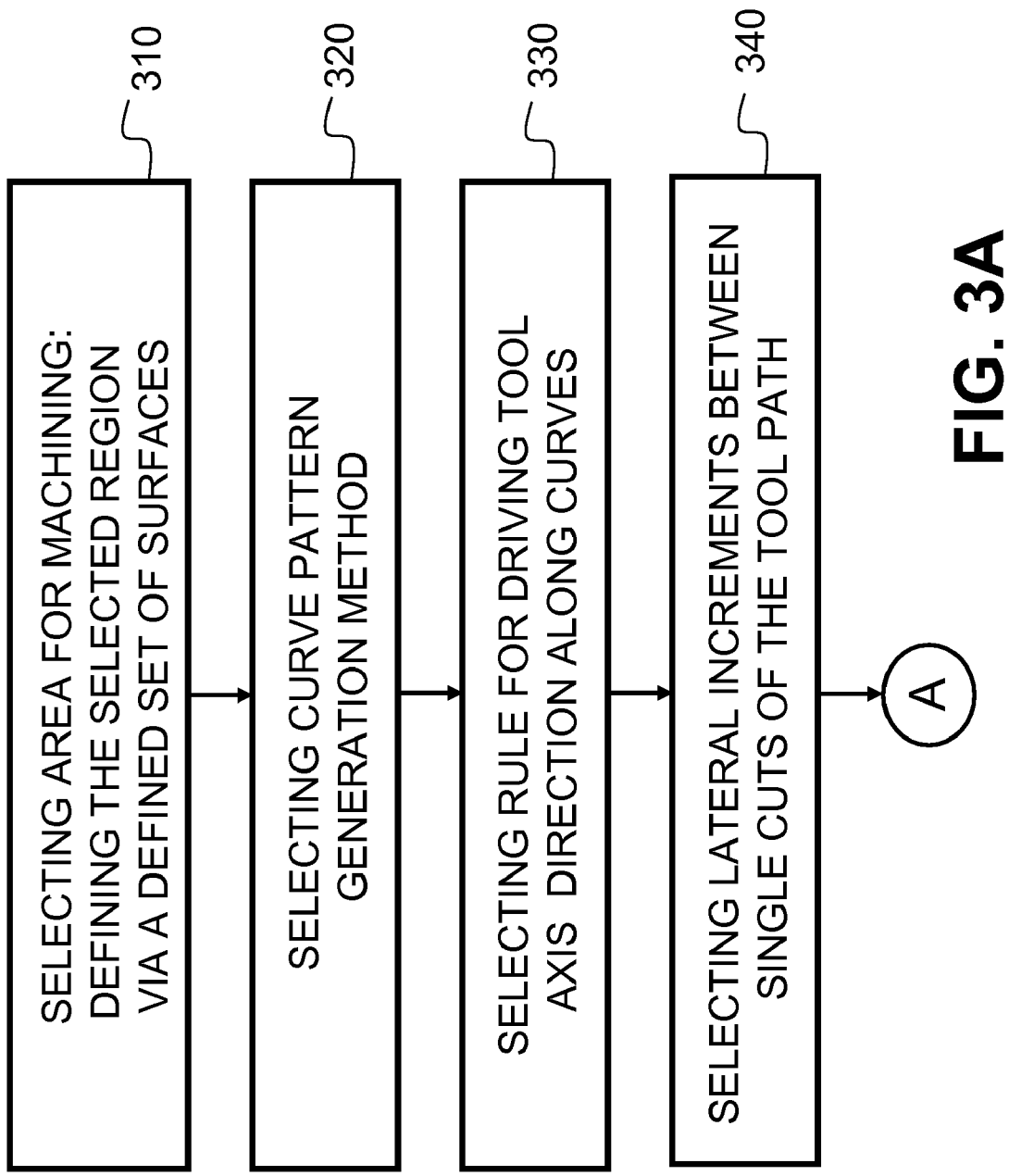
FIG. 3A and FIG. 3B together are a top level flowchart of an exemplary method embodiment of the present invention.
Figure 3B:
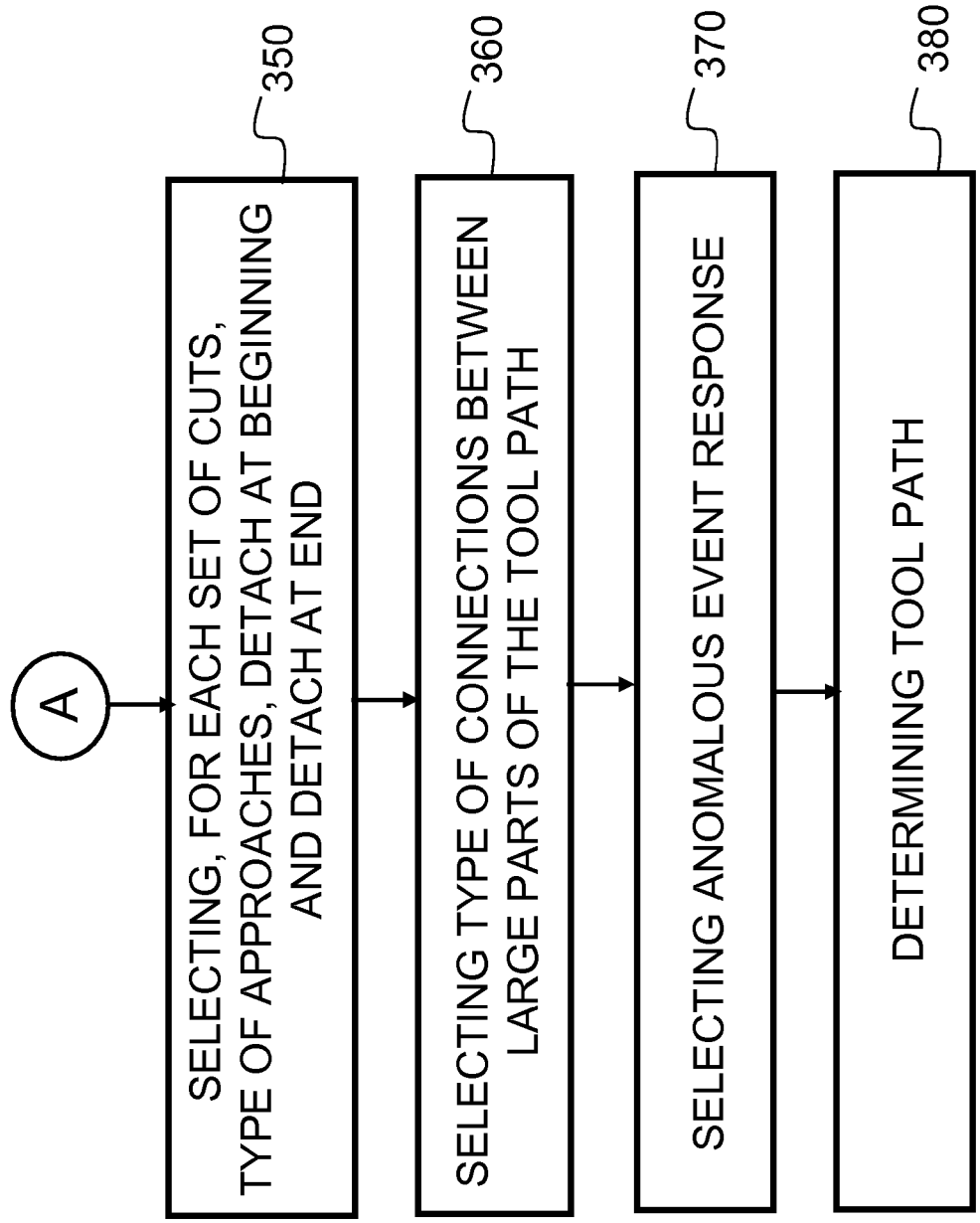

Another method embodiment may be described in the top level flowcharts of FIGS. 3A and 3B. The exemplary steps comprises: selecting an area for machining by defining the selected region via a defined set of surfaces (step 310); selecting a generation method for a pattern of curves (step 320); selecting a rule for driving the tool axis direction along the curves (step 330); selecting the lateral increments between the single cuts of the tool path (step 340); selecting, for each set of cuts, the type of approaches, the detach at the beginning and the detach at the end (step 350); selecting the types of connections between the larger portions of the tool path (step 360); selecting a anomalous event response (step 370); and determining a tool path (step 380).

Figure 4:
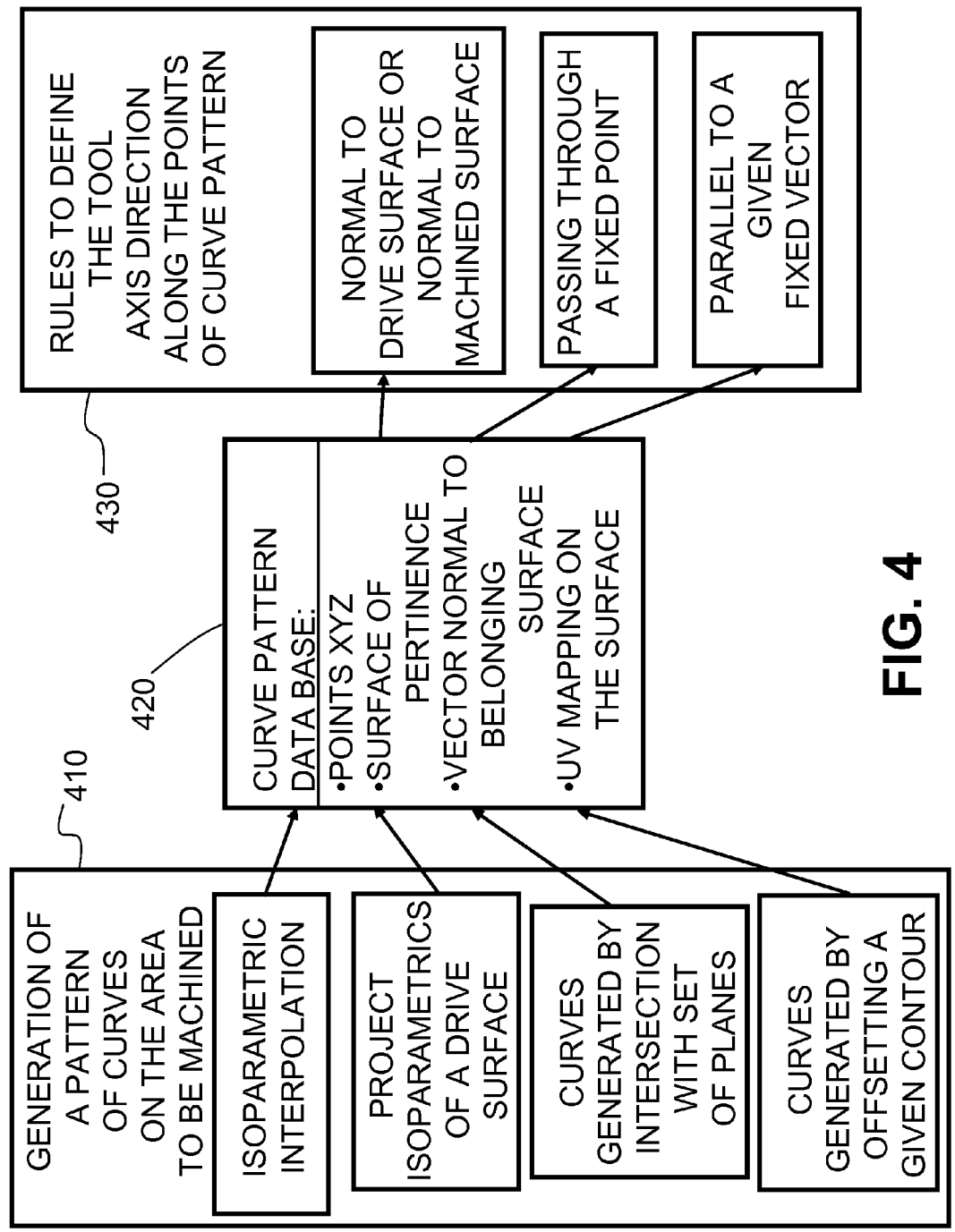
FIG. 4 is an exemplary functional block diagram of a portion of an exemplary embodiment of the present invention.

Illustrated in FIG. 4 is an exemplary functional block diagram of the content and use of a curve pattern database of an embodiment of the present invention. The plurality of rules of generating a pattern of curves on the area to be machined 410 may be used to establish a curve pattern database 420 and the curve pattern database may be referenced to along with the rules to define the machine tool axis direction along the points of the curve 430. Exemplary curve generation methods include: (a) isoparametric interpolation; (b) projection of drive surface isoparametrics; (c) intersection with a set of planes; and (d) offsetting from a defined or given contour. The curve pattern data comprising the curve pattern database may be expressed as: (a) points in XYZ; (b) a surface of pertinence; (c) a vector normal to the belonging surface; and UV-mapping onto the surface, where $U=f_1(x,y,z)$ and $V=f_2(x,y,z)$. The exemplary rules to define a tool axis of direction along the points of the curve pattern may include: (a) a direction normal to the drive surface or normal to the machined surface; (b) a direction passing through a fixed point or through points of a given curve; and (c) a direction parallel to a given fixed vector.

Figure 5A:
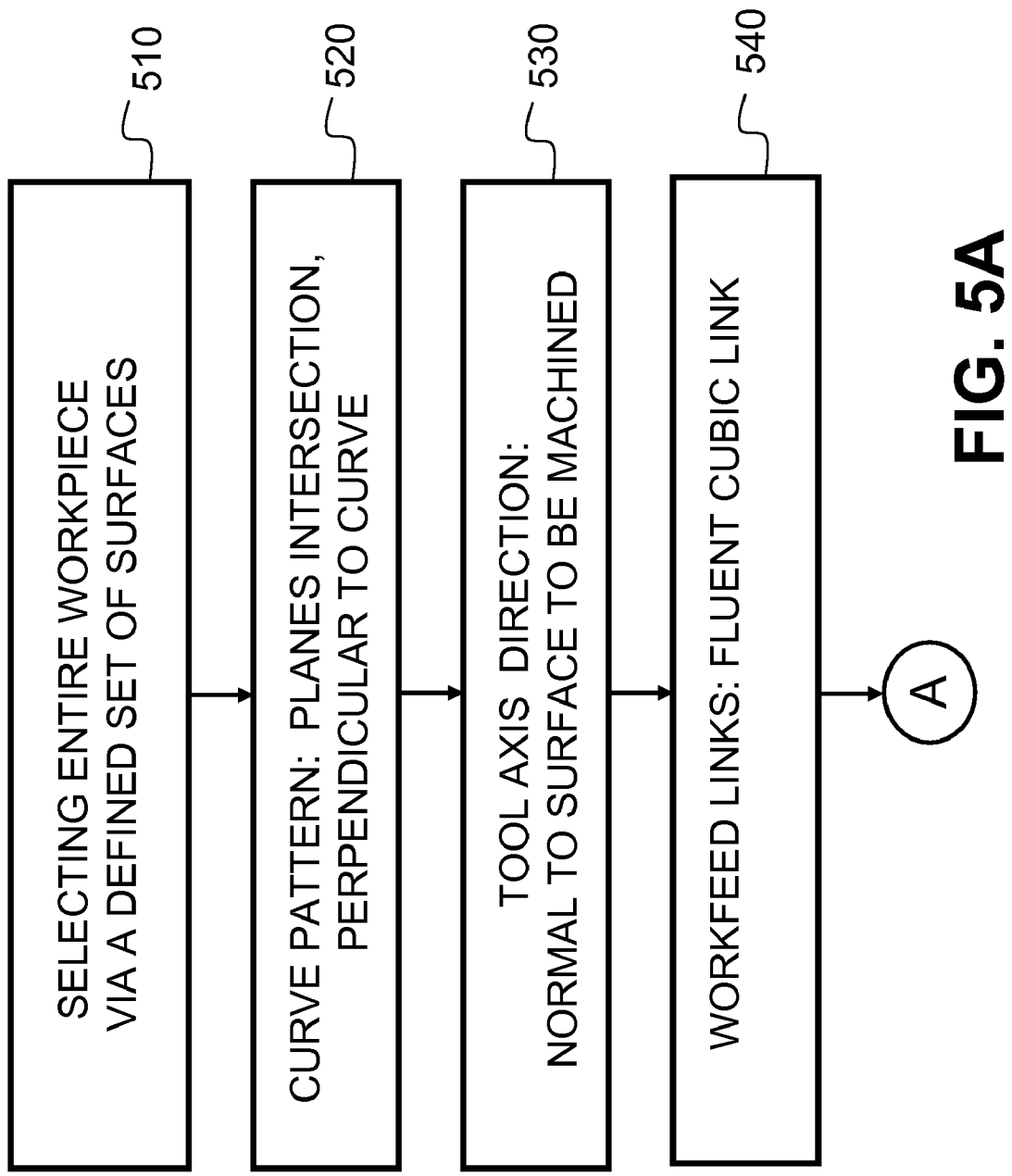

FIGS. 5A and 5B illustrate in top level flowchart form an example of the composite machining method where one may select an entire workpiece for machining (step 510), one may select a curve pattern that comprises a series of planes, each perpendicular to a given curve, that intersect the workpiece surfaces (step 520), the tool axis of direction may be selected as being normal to the surface of the workpiece to be machined (step 530), the lateral increments between single cuts or workfeed links may be selected as fluent cubic links (steps 540); the approaches and detaches are selected as motion about a radius or radii (step 550); and the connection between large portions of the tool path may be selected as rapid links that in this example may be radial about the X-axis (step 560). With the planning completed, the tool path may be determined (step 580).

With this composite machining method, many different methods for machining a part having multiple machining cycles, may be condensed into one composite machining function. From the perspective of the CAM system development, to realize such a composite function implies building each individual orientation and each individual pattern as objects that may be used interchangeably. This interchangeable object approach provides a high rate of reliability in the resulting software, as any individual object is cleared of parasite dependency and appears only once in the software body.

The method of the five-axis composite machining cycle makes available to a user a set of choices for the selection of the pattern, a selection typically larger in number than the state-of-the-art, and makes available the pattern choices in combination with the range of choices for orientation typically greater in number than the state-of-the-art. Accordingly, by selecting a combination of pattern and orientation, the user may readily and reliably setup a five-axis machining cycle. For example, if the number of available choices for the patterns is six, and the available choices for orientation is six, the user may choose from 36 combined ways to machine the part. From the point of view of the CAM system development, adding, in this example, one new choice for the orientation means automatically having six new and different machining cycles—one for each existing pattern.

One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A computer-enabled method of determining a sequence of five-axis operations to be performed by a cutting tool of a machining station on a workpiece, the method comprising:
   determining an area of the workpiece to be machined;
   receiving a machining pattern;
   defining an orientation of an axis of the cutting tool with respect to the workpiece;
   receiving the orientation of at least one of the axes of the cutting tool;
   defining one or more rules for at least one of: (a) approaching the workpiece; (b) departing the workpiece; and (c) linking two or more sub-areas of the determined area of the workpiece to be machined;
   determining a sequence of movements of the cutting tool having five axes of operation, the determination based on the received machining pattern and the received orientation of at least one of the axes of the cutting tool, wherein the determined sequence of movements of the cutting tool is a member of a set of movements of the cutting tool, the set comprising a multiplicative product of a total number of available machining patterns and a total number of available orientations of the axes of the cutting tool; and
   converting into one or more machine instructions at least one of: (a) the determined area of the workpiece to be machined; (b) the machining pattern; (c) the received orientation of at least one of the axes of the cutting tool; and (d) at least one of the defined rules for approaching the workpiece, departing the workpiece, and linking two or more sub-areas of the area of the workpiece to be machined.

2. The computer-enabled method of claim 1 wherein the machining pattern is based on a user selection from a first menu comprising a plurality of machining patterns.

3. The computer-enabled method of claim 1, wherein the orientation of at least one of the axes of the cutting tool is based on a user selection from a second menu comprising a plurality of orientations of the cutting tool.

4. The computer-enabled method of claim 1 further comprising: outputting the sequence of movements of the cutting tool as one or more machine instructions.

5. A device for generating instructions for a machining tool, the device comprising:
   input means for receiving a machining pattern;
   input means for receiving a tool axis orientation;
   a processing module having addressable memory, the processing module adapted to determine a sequence of movements of the cutting tool having five axes of operation, the determination based on a received machining pattern and the received axis of orientation wherein the determined sequence of movements of the cutting tool is a member of a set of sequences of movements of the cutting tool, the set comprising a multiplicative product of a total number of available machining patterns and a total number of available orientations of the axis of the cutting tool; and
   means for outputting the determined sequence of movements of the cutting tool as one or more machine instructions.

6. The device of claim 5 wherein the input means for receiving the machining pattern is at least one of: an electrical communication; a wireless communication receiver; a reader of a memory store; and a reader of portable media.

7. The device of claim 5 wherein the input means for receiving orientation of the axis of the cutting tool is at least one of: an electrical communication; a wireless communication receiver; a reader of a memory store; and a reader of portable media.

8. The device of claim 5 wherein the means for outputting the determined sequence of movements of the cutting tool is at least one of: an electrical communication; a wireless communication transmitter; a writer to a memory store; and a writer to portable media.

9. The device of claim 5 further comprising a user interface adapted to receive a user selection from a first menu comprising a plurality of machining patterns.

10. The device of claim 5 further comprising a user interface adapted to receive a user selection from a second menu comprising a plurality of orientations of the axes of the cutting tool.

11. The device of claim 5 further comprising a user interface adapted to receive a user selection from a first menu comprising a plurality of machining patterns and from a second menu comprising a plurality of orientations of axes of the cutting tool.

12. The device of claim 5 further comprising input means for receiving a workpiece area definition wherein the input means for receiving the workpiece area definition is at least one of: a user interface; an electrical communication; a wireless communication receiver; a reader of a memory store; and a reader of portable media.

13. The device of claim 5 wherein the processing module is further adapted to determine the sequence of movements of the cutting tool based on the received machining pattern, the received orientation of the axis of the cutting tool, and a defined workpiece area to be machined.

14. A method of using a device for composite machining based on tool-path pattern types with cutting tool axis orientation rules for five axes of cutting tool operation comprising:

selecting, via a user interface of the device, from a set of available choices of tool-path pattern types, wherein a displayed set of available choices of tool-path pattern types is independent of a user selection from a displayed set of available choices of tool axis orientation rules;

selecting, via the user interface of the device, from a set of available choices of orientation rules of the axis of the cutting tool, wherein the displayed set of available choices of orientation rules of the axis of the cutting tool is independent of a user selection from the displayed set of available choices of tool-path pattern types; and receiving a sequence of movements of the cutting tool, wherein the received sequence of movements of the cutting tool, within the five axes of cutting tool operation, is a member of a set of sequences of movements of the cutting tool, the set comprising a multiplicative product of a total number of available tool-path pattern types and a total number of available orientations of the axis of the cutting tool.

* * * * *